(12) United States Patent
Yoshinaga

(10) Patent No.: US 12,524,004 B2
(45) Date of Patent: Jan. 13, 2026

(54) MONITORING CENTER, MONITORING SYSTEM AND METHOD

(71) Applicant: DENSO CORPORATION, Kariya (JP)

(72) Inventor: Satoshi Yoshinaga, Kariya (JP)

(73) Assignee: DENSO CORPORATION, Aichi-pref. (JP)

( * ) Notice: Subject to any disclaimer, the term of this patent is extended or adjusted under 35 U.S.C. 154(b) by 771 days.

(21) Appl. No.: 17/656,363

(22) Filed: Mar. 24, 2022

(65) Prior Publication Data

US 2022/0214684 A1 Jul. 7, 2022

Related U.S. Application Data

(63) Continuation of application No. PCT/JP2020/028382, filed on Jul. 22, 2020.

(30) Foreign Application Priority Data

Sep. 27, 2019 (JP) .................................. 2019-177194

(51) Int. Cl.
G05D 1/00 (2024.01)
(52) U.S. Cl.
CPC ......... *G05D 1/0038* (2013.01); *G05D 1/0061* (2013.01)
(58) Field of Classification Search
CPC .. G05D 1/0038; G05D 1/0061; G08G 1/0112; G08G 1/0133; G08G 1/0141; G08G 1/096708; G08G 1/096741; G08G 1/096775; G08G 1/0104; G08G 1/09; G08G 1/095; G08G 1/096725; G08B 25/04; H04M 11/00; H04M 11/022; H04Q 9/00; H04Q 2209/80

USPC .......................................................... 701/301
See application file for complete search history.

(56) References Cited

U.S. PATENT DOCUMENTS 9,205,816 B2 * 12/2015 Kobana .................. B60K 28/06
9,277,360 B2 * 3/2016 Fay ..................... G06Q 30/0261
2013/0018549 A1 * 1/2013 Kobana .................. B60K 28/06
701/41

(Continued)

FOREIGN PATENT DOCUMENTS

CN 103857550 A * 6/2014 ......... B60K 31/0008
CN 104699100 A * 6/2015

(Continued)

*Primary Examiner* — B M M Hannan
(74) *Attorney, Agent, or Firm* — Maschoff Brennan

(57) ABSTRACT

A monitoring center configured to communicate with an autonomous vehicle and monitor the autonomous vehicle is provided. The monitoring center includes a threshold storage unit that stores a threshold of a vehicle stop duration for determining whether it is necessary to provide operator's assistance, a communication unit that receives vehicle state data from the autonomous vehicle, an analysis unit that obtains a vehicle stop duration from the vehicle state data, the vehicle stop duration being a period of time for which the autonomous vehicle has been stopped up to a current time, a determination unit that determines whether the vehicle stop duration of the vehicle is greater than or equal to the threshold stored in the threshold storage unit, and an operator cooperation unit that notifies an operator of data concerning the vehicle when the vehicle stop duration of the vehicle is greater than or equal to the threshold.

15 Claims, 16 Drawing Sheets

(56) References Cited

U.S. PATENT DOCUMENTS

| | | | |
|---|---|---|---|
| 2018/0147988 A1* | 5/2018 | Lee | G08G 1/0133 |
| 2019/0008248 A1* | 1/2019 | Kovtun | G05D 1/0088 |
| 2019/0137999 A1 | 5/2019 | Taguchi et al. | |
| 2019/0286454 A1* | 9/2019 | Sano | B60R 16/0231 |
| 2021/0197808 A1 | 7/2021 | Maeda et al. | |
| 2021/0325871 A1 | 10/2021 | Taguchi et al. | |

FOREIGN PATENT DOCUMENTS

| | | | | |
|---|---|---|---|---|
| CN | 104875177 A | * | 9/2015 | |
| CN | 105031916 A | * | 11/2015 | |
| CN | 108121343 A | * | 6/2018 | B60K 35/00 |
| JP | 2000353013 A | * | 12/2000 | |
| JP | 2005001052 A | * | 1/2005 | |
| JP | 2010015346 A | * | 1/2010 | B60R 1/00 |
| JP | 5551952 B2 | * | 7/2014 | G08G 1/143 |
| JP | 2019087015 A | * | 6/2019 | B60W 30/09 |
| JP | 6628375 B1 | * | 1/2020 | |
| JP | 2020038585 A | * | 3/2020 | |
| WO | WO-2010099416 A1 | * | 9/2010 | B60Q 9/005 |
| WO | WO-2014117925 A1 | * | 8/2014 | E05F 15/43 |
| WO | WO-2019014277 A1 | * | 9/2019 | A45C 15/00 |

* cited by examiner

| DRIVING SCENE | THRESHOLD |
|---|---|
| GOING STRAIGHT | O MINUTES |
| WAITING FOR LEFT TURN | O MINUTES |
| WAITING FOR RIGHT TURN | O MINUTES |
| ⋮ | ⋮ |

| AREA | THRESHOLD |
|---|---|
| AREA A | ○ MINUTES |
| AREA B | ○ MINUTES |
| AREA C | ○ MINUTES |
| ⋮ | ⋮ |

| ROAD STRUCTURE | THRESHOLD |
|---|---|
| VICINITY OF CROSSWALK | O MINUTES |
| VICINITY OF INTERSECTION | O MINUTES |
| VICINITY OF T-JUNCTION | O MINUTES |
| ⋮ | ⋮ |

| TIME PERIOD | THRESHOLD |
|---|---|
| 0:00 – 6:00 | ○ MINUTES |
| 6:00 – 12:00 | ○ MINUTES |
| 12:00 – 18:00 | ○ MINUTES |
| 18:00 – 0:00 | ○ MINUTES |
| ⋮ | ⋮ |

| AREA | ROAD STRUCTURE | THRESHOLD |
|---|---|---|
| AREA A | VICINITY OF CROSSWALK | O MINUTES |
| | VICINITY OF INTERSECTION | O MINUTES |
| | VICINITY OF T-JUNCTION | O MINUTES |
| | ⋮ | ⋮ |
| AREA B | VICINITY OF CROSSWALK | O MINUTES |
| | VICINITY OF INTERSECTION | O MINUTES |
| | VICINITY OF T-JUNCTION | O MINUTES |
| | ⋮ | ⋮ |
| AREA C | VICINITY OF CROSSWALK | O MINUTES |
| | VICINITY OF INTERSECTION | O MINUTES |
| | VICINITY OF T-JUNCTION | O MINUTES |
| | ⋮ | ⋮ |
| ⋮ | ⋮ | ⋮ |

MONITORING CENTER, MONITORING SYSTEM AND METHOD

CROSS-REFERENCE TO RELATED APPLICATION

The present application is based on and claims the benefit of priority from earlier Japanese Patent Application No. 2019-177194 filed Sep. 27, 2019, the description of which is incorporated herein by reference.

BACKGROUND

Technical Field

The present disclosure relates to a monitoring center for an autonomous vehicle and a monitoring system including the same.

Related Art

There have been known remote monitoring techniques for ensuring safety of autonomous vehicles during autonomous traveling.

SUMMARY

As an aspect of the present disclosure, a monitoring center is provided which is configured to communicate with an autonomous vehicle via a network and monitor the autonomous vehicle. The monitoring center includes: a threshold storage unit that stores a threshold of a vehicle stop duration for determining whether it is necessary to provide operator's assistance; a communication unit that receives vehicle state data from the autonomous vehicle; an analysis unit that obtains a vehicle stop duration from the vehicle state data, the vehicle stop duration being a period of time for which the autonomous vehicle has been stopped up to a current time; a determination unit that determines whether the vehicle stop duration of the autonomous vehicle is greater than or equal to the threshold stored in the threshold storage unit; an operator cooperation unit that notifies an operator of data concerning the autonomous vehicle when the vehicle stop duration of the autonomous vehicle is greater than or equal to the threshold; a vehicle stop period storage unit that obtains a vehicle stop period from the vehicle state data and stores the vehicle stop period, the vehicle stop period being a period of time from when the autonomous vehicle makes a stop to when the autonomous vehicle resumes traveling without operator's assistance; and a threshold determining unit that determines the threshold based on a distribution of the vehicle stop period. The threshold determining unit stores the determined threshold in the threshold storage unit.

BRIEF DESCRIPTION OF THE DRAWINGS

In the accompanying drawings:

FIG. 4 is a diagram showing an example of data stored in a threshold storage unit of a second embodiment;

FIG. 6 is a diagram showing an example of data stored in a threshold storage unit of a third embodiment;

FIG. 8 is a diagram showing an example of data stored in a threshold storage unit of a fourth embodiment;

FIG. 10 is a diagram showing an example of data stored in a threshold storage unit of a fifth embodiment;

FIG. 12 is a diagram showing an example of data stored in a threshold storage unit of a sixth embodiment;

DETAILED DESCRIPTION OF THE PREFERRED EMBODIMENTS

There have been known remote monitoring techniques for ensuring safety of autonomous vehicles during autonomous traveling. In JP 2019-87015 A, an autonomous vehicle automatically stops upon detection of an obstacle based on information acquired from an autonomous sensor including a camera, and transmits an image of the surroundings of the vehicle captured by the camera to a remote monitoring center. When the autonomous vehicle automatically stops, the remote monitoring center determines, based on the received image captured by the camera, whether it should resume traveling of the autonomous vehicle. In this configuration, an observer (operator) in the remote monitoring center supplements the detection performance of the sensor of the autonomous vehicle to ensure safety in autonomous traveling of the vehicle.

According to the invention disclosed in JP 2019-87015 A, the operator is called every time the vehicle makes a stop even in a situation where the vehicle can resume traveling after waiting for a while. As a consequence, a monitoring task is given to the operator regardless of whether remote operation is actually necessary. This causes a problem that a load is applied on the operator and a labor cost (cost) for the operator increases.

In view of the above circumstances, the present disclosure aims to provide a monitoring system capable of reducing a load on an operator.

With reference to the drawings, a monitoring system of an embodiment of the present disclosure will be described.

First Embodiment

Figure 1:
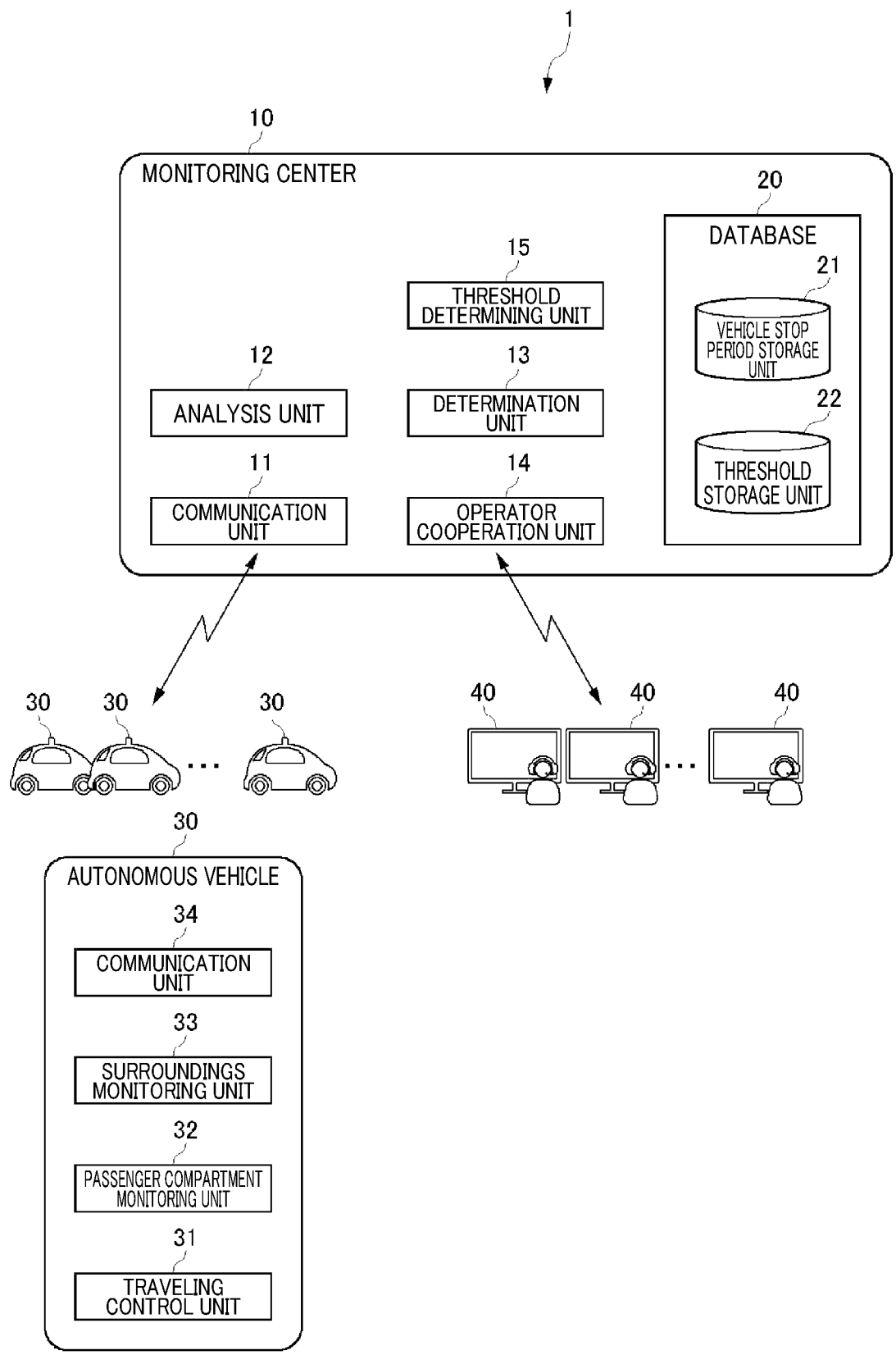
FIG. 1 is a diagram showing a configuration of a monitoring system of a first embodiment.

FIG. 1 is a diagram showing a configuration of a monitoring system 1 of a first embodiment. The monitoring system 1 includes a monitoring center 10 and a plurality of autonomous vehicles 30. The monitoring center 10 monitors the autonomous vehicles 30. The autonomous vehicles 30 are configured to communicate with the monitoring center 10 via a network. The autonomous vehicles 30 are monitored by the monitoring center 10.

[Monitoring Center]

The monitoring center 10 is connected to operator terminals 40 that are operated by operators. When an autonomous vehicle 30 requires assistance, the monitoring center 10 transmits data concerning the autonomous vehicle 30 to the operator terminal 40 to cooperate with the operator. When a period of time for which the autonomous vehicle 30 has been stopped (hereinafter, referred to as a "vehicle stop duration") becomes greater than or equal to a predetermined threshold, the monitoring center 10 sends a notification to the operator to cooperate with the operator.

The monitoring center 10 includes a communication unit 11, an analysis unit 12, a determination unit 13, an operator cooperation unit 14, a threshold determining unit 15 and a database 20. The database 20 includes a vehicle stop period storage unit 21 and a threshold storage unit 22. The threshold storage unit 22 stores a threshold of the vehicle stop duration for determining whether it is necessary to provide operator's assistance. The threshold is determined based on statistical data of vehicle stop periods acquired from a large number of autonomous vehicles 30.

The communication unit 11 has a function of communicating with the autonomous vehicles 30. The communication unit 11 receives data (vehicle state data) from the autonomous vehicle 30 regarding vehicle states of the autonomous vehicle 30. The vehicle state data includes data regarding traveling states of the vehicle (e.g., acceleration, speed and traveling direction), a current position, operation states of on-vehicle devices (e.g., blinkers, wipers, light, brake and accelerator) and the like. The analysis unit 12 has a function of calculating a period of time for which the vehicle has been continuously stopped based on the speed data included in the vehicle state data.

Here, it is preferred that the analysis unit 12 also uses data regarding the surrounding environment of the autonomous vehicle 30 to calculate the vehicle stop duration. In this case, the monitoring center 10 receives data regarding the surrounding environment in addition to the vehicle state data from the autonomous vehicle 30. The data concerning the surrounding environment is the sensor data acquired by a surroundings monitoring unit 33 of the autonomous vehicle 30, and may include, for example, detection data of an object detected by a LIDAR and an image captured by a camera. Further, when the autonomous vehicle 30 has acquired data concerning the surroundings from infrastructure, other vehicles, networks, or the like via a V2X communication, such data may also be used.

The analysis unit 12 determines, from the vehicle state data and the surrounding environment data, whether the vehicle is in a specific situation where it needs to be stopped such as waiting for a traffic light, having arrived at a destination or waiting for getting on and off of passengers, and calculates a vehicle stop duration by adding a period of time during which the vehicle is not in such a situation. Whether the vehicle is waiting for a traffic light can be determined from the color of the traffic light by extracting the traffic light from an image of the surroundings of the vehicle captured by a camera. Whether the vehicle has arrived at a destination can be determined from the destination position and the current position in the travel route information. Whether the vehicle is waiting for getting on and off of passengers can be determined from an image captured by an in-vehicle camera.

The determination unit 13 has a function of determining whether the vehicle stop duration of the autonomous vehicle 30 is greater than or equal to the threshold stored in the threshold storage unit 22. When the vehicle stop duration is greater than or equal to the predetermined threshold, the determination unit 13 notifies the operator cooperation unit 14 that the vehicle stop duration is greater than or equal to the threshold. Upon receiving the notification, the operator cooperation unit 14 transmits a notification requesting the operator terminal 40 to provide assistance to the autonomous vehicle 30. Here, the operator cooperation unit 14 transmits the data concerning the autonomous vehicle 30 to the operator terminal 40.

Next, a method of determining a threshold stored in the threshold storage unit 22 will be described below. The threshold determining unit 15 determines a threshold based on the data of the vehicle stop period acquired from the autonomous vehicles 30. The vehicle stop period is obtained by measuring a period of time from when the autonomous vehicle 30 makes a stop to when the autonomous vehicle 30 starts moving. When the autonomous vehicle 30 starts moving with operator's assistance, it is triggered by the operator's assistance, and the autonomous vehicle does not autonomously start moving. In this case, the period of time is excluded from the data of the vehicle stop period. On the other hand, when the operator decides that it is not necessary to provide assistance in spite of the assistance request being sent to the operator (for example, when the autonomous vehicle is at the tail of a traffic jam and just has to wait), the autonomous vehicle autonomously resumes traveling afterwards. In this case, the period of time until the autonomous vehicle resumes traveling can be included in the data of the vehicle stop period. The data of the vehicle stop period thus measured are stored in the vehicle stop period storage unit 21.

The threshold determining unit 15 determines a threshold based on the data of the vehicle stop period stored in the vehicle stop period storage unit 21. In the present embodiment, the threshold is determined based on a distribution of the data of the vehicle stop period.

Figure 2:
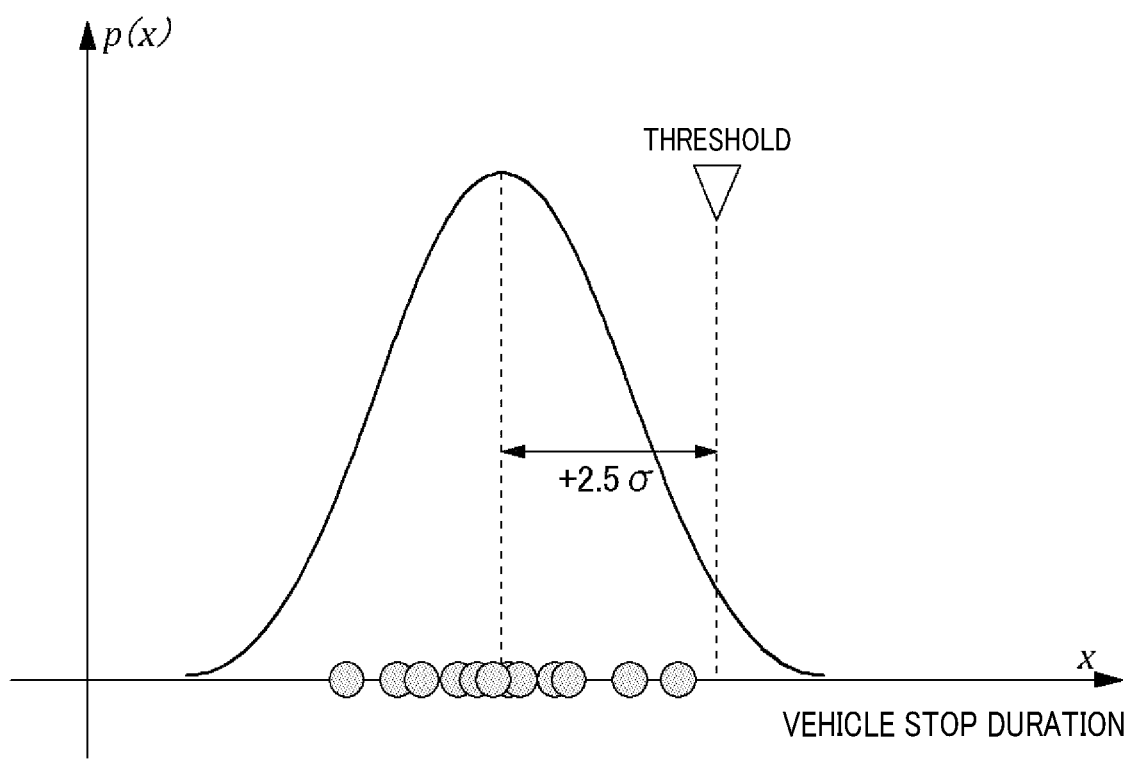
FIG. 2 is a diagram showing a probability distribution of vehicle stop periods.

FIG. 2 is a diagram showing a probability distribution of vehicle stop periods. The horizontal axis represents the vehicle stop period, and the vertical axis represents a probability density of an event corresponding to the vehicle stop period. In the present embodiment, the period of time longer than the mean value of the vehicle stop period by 2.5 $\sigma$ is set to the threshold. The threshold for determining whether to request the operator to provide assistance is a situation where the autonomous vehicle 30 has been stopped for a period of time longer than the vehicle stop period normally expected, which indicates that an abnormality may have occurred in the autonomous vehicle 30.

Therefore, the threshold is set to a period of time longer than the mean value of the vehicle stop period. Although the threshold in this embodiment is set to +2.5 $\sigma$ from the mean value, the value added to the mean value may not necessarily be 2.5 $\sigma$. The threshold determining unit 15 stores the determined threshold in the threshold storage unit 22.

[Autonomous Vehicle]

The autonomous vehicle 30 includes a traveling control unit 31, a passenger compartment monitoring unit 32, the surroundings monitoring unit 33 and a communication unit 34. The traveling control unit 31 has a function of controlling traveling of the autonomous vehicle 30. The traveling control unit 31 controls throttle, braking, steering, and the like. The passenger compartment monitoring unit 32 has a function of monitoring the state of a driver and occupants. The passenger compartment monitoring unit 32 may be, for example, a camera capturing images inside a passenger compartment, or a seating sensor. The surroundings monitoring unit 33 has a function of monitoring the surroundings of the vehicle. The surroundings monitoring unit 33 may include, for example, a camera, a LIDAR device, a millimeter-wave radar device, an ultrasonic sensor, and the like. The communication unit 34 has a function of communicating with the monitoring center 10. The communication unit 34 includes a communication device, an antenna, and the like. In addition, the communication unit 34 may further have a function of communicating with infrastructure or other vehicles.

The autonomous vehicle 30 transmits control data from the traveling control unit 31 and sensing data acquired by the passenger compartment monitoring unit 32 and the surroundings monitoring unit 33 to the monitoring center 10 via the communication unit 34. The vehicle state data may be transmitted to the monitoring center 10 on a periodic basis, or when the autonomous vehicle 30 stops upon detection of a danger.

[Operation of Monitoring Center]

Figure 3:
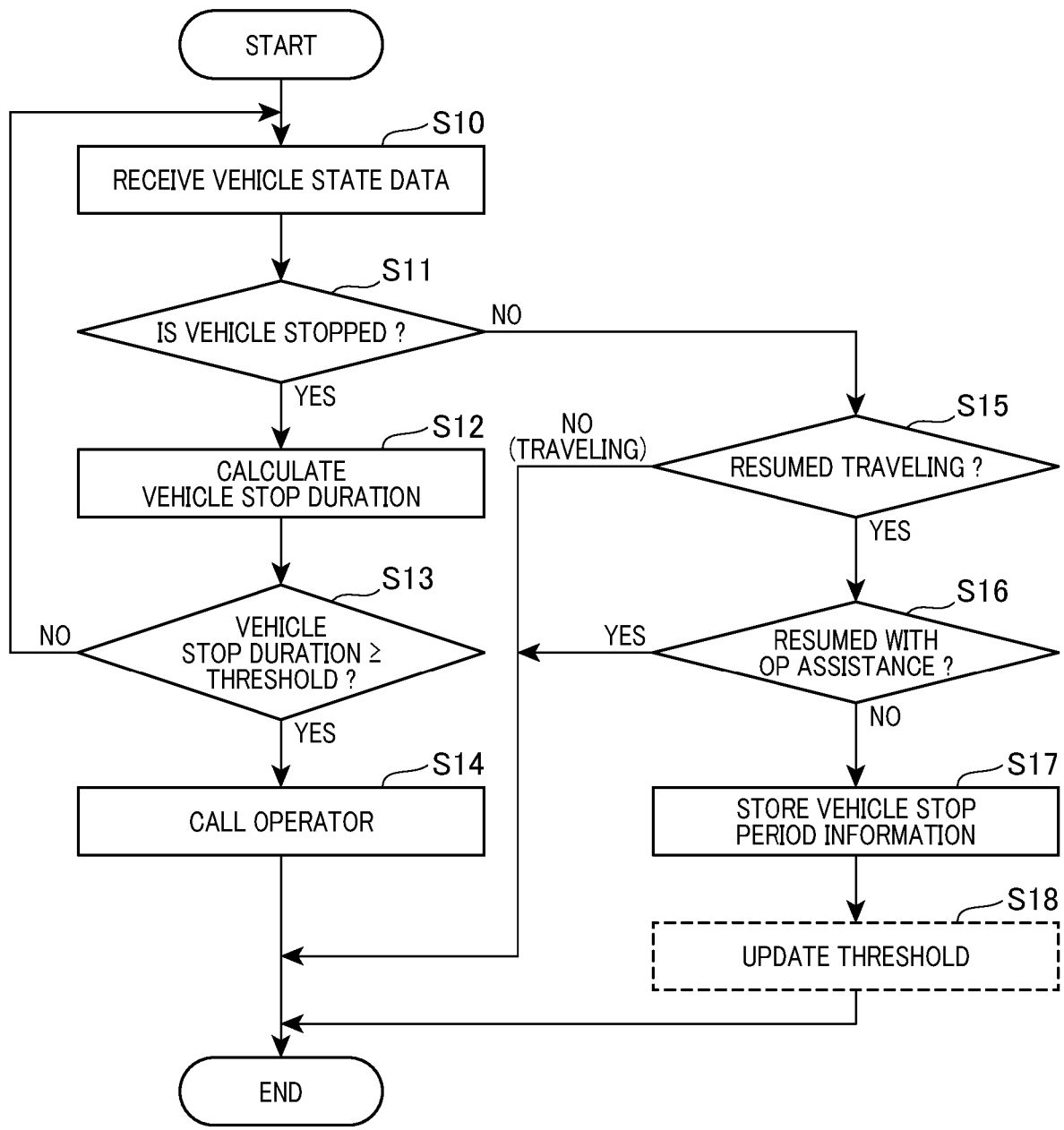
FIG. 3 is a diagram showing operation of a monitoring center of the first embodiment.

FIG. 3 is a flowchart showing operation of the monitoring center 10. The monitoring center 10 receives vehicle state data from the autonomous vehicle 30 (S10). The analysis unit 12 of the monitoring center 10 determines whether the autonomous vehicle 30 is stopped based on the vehicle state data (S11). If it is determined that the autonomous vehicle 30 is stopped (YES in S11), the analysis unit 12 calculates a vehicle stop duration of the autonomous vehicle 30 (S12). Specifically, the analysis unit 12 stores the time when the state of the autonomous vehicle 30 has changed from "traveling" to "stopped" as a vehicle stop time, and calculates a difference between the current time and the vehicle stop time.

Then, the determination unit 13 of the monitoring center 10 determines whether the vehicle stop duration is greater than or equal to the threshold (S13). If it is determined that the vehicle stop duration is greater than or equal to the threshold (YES in S13), the operator cooperation unit 14 transmits a notification requesting the operator terminal 40 to provide assistance to the autonomous vehicle 30, and calls an operator (S14). The operator checks images or the like transmitted from the autonomous vehicle 30, and provides instructions to the autonomous vehicle. If it is determined that the vehicle stop duration is not greater than or equal to the threshold (NO in S13), the process returns to the step (S10) in which the monitoring center 10 receives the vehicle state data.

If the analysis unit 12 determines that the autonomous vehicle 30 is not stopped as a result of the determination of whether the vehicle is stopped based on the vehicle state data (NO in S11), the analysis unit 12 determines whether the vehicle has resumed traveling (S15). Specifically, when the previous state of the autonomous vehicle 30 was "stopped", which in turn changed to "traveling", it is determined that the vehicle has resumed traveling. When the previous state was "traveling," it is determined that the vehicle has continued traveling (that is, the vehicle is traveling) (NO in S15).

If it is determined that the vehicle has resumed traveling (YES in S15), it is then determined whether the autonomous vehicle 30 has resumed traveling with operator's assistance (S16). If it is determined that the vehicle has resumed traveling without operator's assistance (NO in S16), a period of time from when the vehicle made a stop to when the vehicle resumed traveling, that is, a vehicle stop period, is stored in the vehicle stop period storage unit 21 (S17). The threshold determining unit 15 determines a threshold in a timely manner based on the data of the vehicle stop period stored in the vehicle stop period storage unit 21 (S18). For example, the threshold determining unit 15 may determine a threshold by using a predetermined number of recent samples (e.g., 1,000 samples). Thus, an appropriate threshold can be determined based on the recent situations. In the flowchart of FIG. 3, determination of the threshold by the threshold determining unit 15 is indicated by a dotted line because it is not performed every time the vehicle stop period is stored.

Although FIG. 3 illustrates the operation as being triggered by communication with one autonomous vehicle 30, the monitoring center 10 monitors a plurality of autonomous vehicles 30 and performs the procedure shown in FIG. 3 simultaneously for each of the plurality of autonomous vehicles 30.

The configuration of the monitoring center 10 according to the present embodiment has been described. An example of hardware of the monitoring center 10 is a computer including a CPU, a RAM, a ROM, a hard disk, a communication interface, and the like. The RAM or ROM stores programs having modules implementing the functions described above so that the monitoring center 10 is implemented by the CPU executing the programs. Such programs are also included in the scope of the present disclosure.

The monitoring system 1 of the first embodiment performs operator cooperation when the vehicle stop duration has become greater than or equal to the threshold, and does not send a notification to the operator unless the vehicle stop duration becomes greater than or equal to the threshold. Accordingly, the operator is called only in a situation where the autonomous vehicle is highly likely to require remote assistance from the operator, which reduces the number of notifications to the operator. For example, according to the invention disclosed in JP 2019-87015 A, when an autonomous vehicle makes a stop upon detection of an obstacle, it transmits a vehicle stop signal to a remote monitoring center even in a situation where the vehicle can resume traveling after waiting for a while, and requests an observer (operator) in the remote monitoring center to check the surrounding situation of the vehicle. Thus, a monitoring task is given to the operator every time the vehicle makes a stop. On the other hand, according to the monitoring system 1, a notification is not sent to the operator every time the autonomous vehicle makes an automatic stop. The notification is sent only when the vehicle stop duration becomes greater than or equal to the threshold. Accordingly, the operator is called only in a situation where the autonomous vehicle is highly likely to require remote assistance from the operator. Therefore, the load on the operator can be reduced. Further, since the threshold is determined based on past vehicle stop periods, the operator is notified about the autonomous vehicle 30 that requires assistance at an appropriate timing while the number of notifications to the operator is reduced.

Although it has been described in the present embodiment that the operator is not notified immediately when the autonomous vehicle makes a stop, and is notified when the vehicle stop duration has become greater than or equal to the threshold, an exception in this procedure can be set. The threshold is determined based on the past vehicle stop information. Therefore, when the vehicle makes a stop at a place that is not usually expected (for example, in the middle of a railroad crossing), a notification to the operator can be immediately sent without waiting until the vehicle stop duration becomes greater than or equal to the threshold.

Second Embodiment

Next, a monitoring system according to a second embodiment will be described. The basic configuration of the monitoring system according to the second embodiment is the same as the monitoring system 1 of the first embodiment (see FIG. 1). The second embodiment is different from the first embodiment in that a threshold for determining the vehicle stop duration corresponds to a driving scene. The monitoring center 10 includes a threshold storage unit 23 (FIG. 4) that stores thresholds corresponding to driving scenes, instead of the threshold storage unit 22.

FIG. 4 is a diagram showing the data stored in the threshold storage unit 23. The threshold storage unit 23 stores thresholds associated with driving scenes. As shown in FIG. 4, the driving scene may include, for example, "going straight," "waiting for a left turn," "waiting for a right turn," and the like. The threshold is determined from a distribution of the data of the vehicle stop period acquired for each driving scene.

Figure 5:
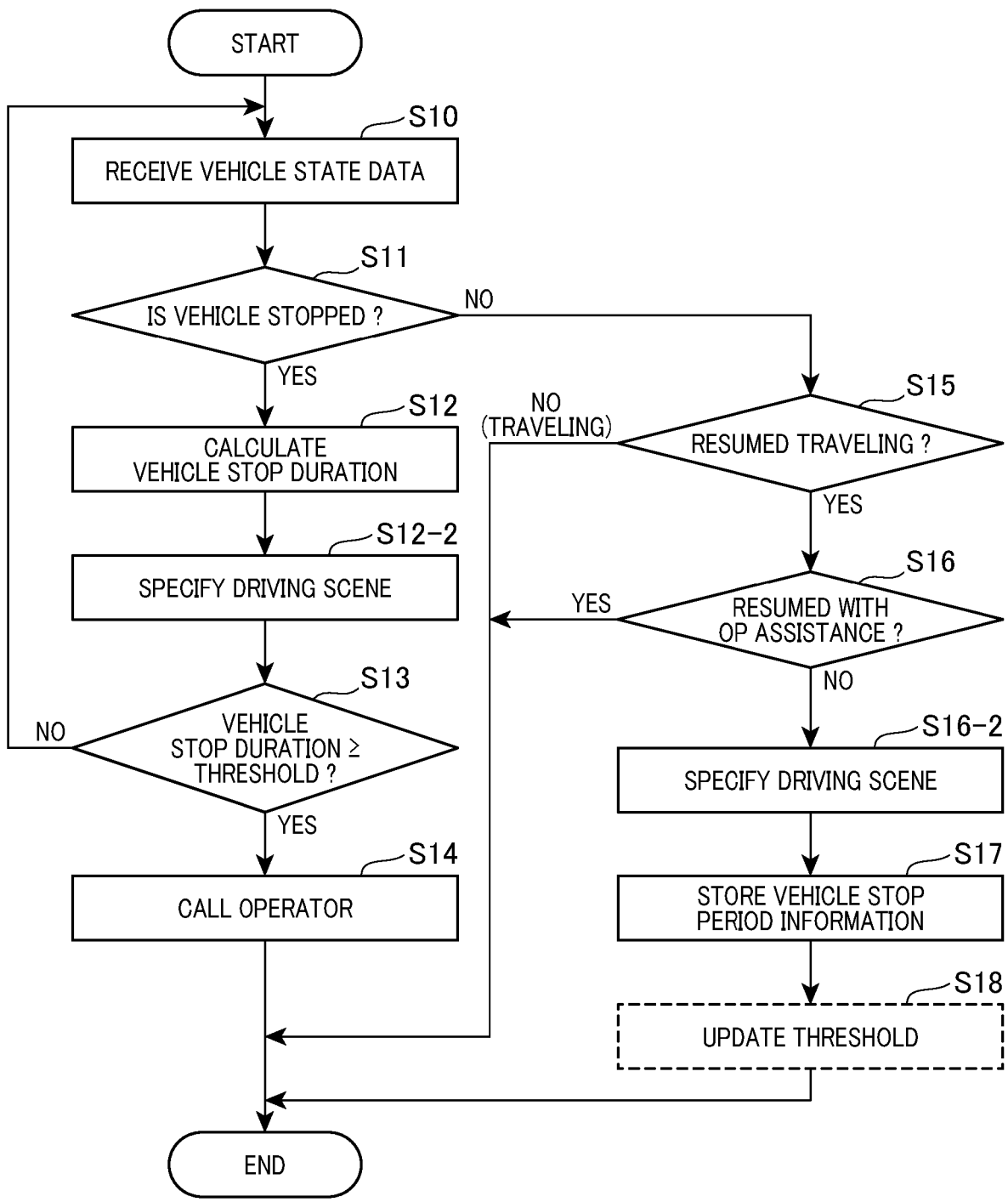
FIG. 5 is a diagram showing operation of a monitoring center of the second embodiment.

FIG. 5 is a flowchart showing operation of the monitoring center 10 according to the second embodiment. The basic operation of the monitoring center 10 according to the second embodiment is the same as that of the monitoring center 10 of the first embodiment. The monitoring center 10 of the second embodiment is different from that of the first embodiment in that it performs processing according to a driving scene. Accordingly, the following description focuses on the differences from the first embodiment.

The monitoring center determines whether the autonomous vehicle 30 is stopped based on the vehicle state data transmitted from the vehicle (S11). If it is determined that the vehicle is stopped (YES in S11), the monitoring center 10 calculates a vehicle stop duration of the autonomous vehicle 30 (S12). Then, the monitoring center 10 specifies the driving scene in which the autonomous vehicle 30 is located, based on the vehicle state data (S12-2). For example, the analysis unit 12 can specify the scene in which the vehicle is located from among the "going straight," "waiting for a left turn," and "waiting for a right turn," based on the data of a lighting state of the blinker. The monitoring center 10 reads the threshold corresponding to the driving scene from the threshold storage unit 23, and compares the threshold with the vehicle stop duration (S13). If the vehicle stop duration is greater than or equal to the threshold, the monitoring center 10 transmits the data concerning the autonomous vehicle 30 to the operator terminal 40, and calls an operator (S14).

If it is determined that the autonomous vehicle 30 has resumed traveling (YES in S15) and that the vehicle has resumed traveling without operator's assistance (NO in S16), the monitoring center 10 specifies the driving scene in which the autonomous vehicle 30 was stopped (S16-2). Then, the monitoring center 10 stores the vehicle stop period associated with the specified driving scene in the vehicle stop period storage unit 21 (S17). Thus, the threshold determining unit 15 can determine the threshold for each driving scene.

The monitoring system of the second embodiment performs operator cooperation when the vehicle stop duration has become greater than or equal to the threshold, and does not send a notification to the operator unless the vehicle stop duration becomes greater than or equal to the threshold. Therefore, the number of notifications to the operator can be reduced. Further, since the threshold corresponds to the driving scene, a notification can be performed at a timing appropriate for the characteristics of each driving scene. For example, in the scene waiting for a right turn, the vehicle stop duration tends to be long due to the time required to wait for a timing when the vehicle can make a right turn.

Third Embodiment

Next, a monitoring system according to a third embodiment will be described. The basic configuration of the monitoring system according to the third embodiment is the same as the monitoring system 1 of the first embodiment (see FIG. 1). The third embodiment is different from the first embodiment in that a threshold for determining the vehicle stop duration corresponds to an area in which the autonomous vehicle 30 is present. The monitoring center 10 includes a threshold storage unit 24 (FIG. 6) that stores thresholds corresponding to areas, instead of the threshold storage unit 22.

FIG. 6 is a diagram showing data stored in the threshold storage unit 24. The threshold storage unit 24 stores thresholds associated with areas. As shown in FIG. 6, the area may include, for example, "area A," "area B," "area C," and the like. The threshold is determined from the distribution of the data of the vehicle stop period acquired for each area. For example, the areas can be defined by dividing a lane or a road having a set of lanes at specific distances, or dividing a map into a mesh at specific intervals.

Figure 7:
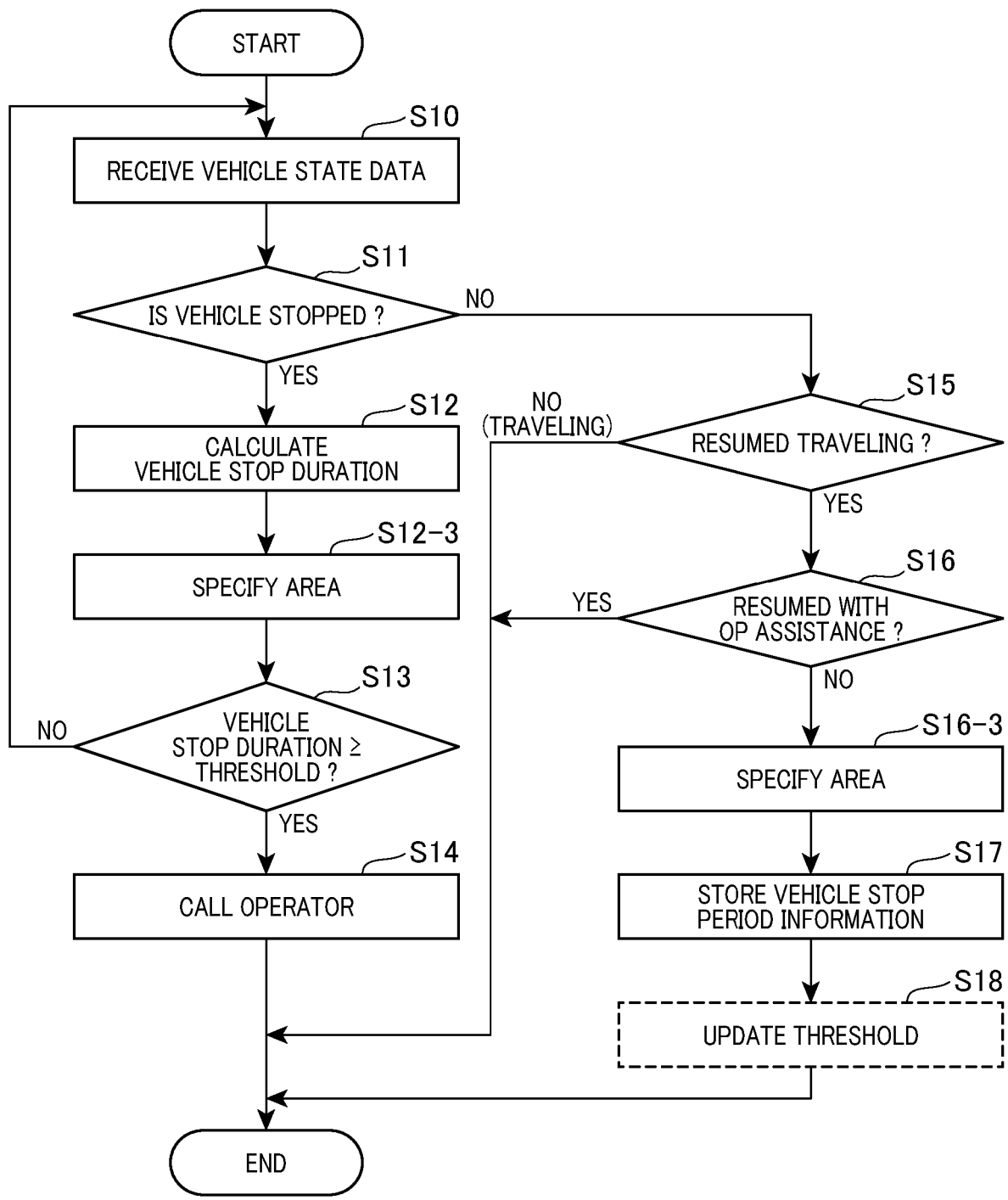
FIG. 7 is a diagram showing operation of a monitoring center of the third embodiment.

FIG. 7 is a flowchart showing operation of the monitoring center 10 according to the third embodiment. The basic operation of the monitoring center 10 according to the third embodiment is the same as that of the monitoring center 10 of the first embodiment. The monitoring center 10 of the third embodiment is different from that of the first embodiment in that it performs processing according to the driving scene. Accordingly, the following description focuses on the differences from the first embodiment.

The monitoring center 10 determines whether the autonomous vehicle 30 is stopped, based on the vehicle state data transmitted from the vehicle (S11). If it is determined that the vehicle is stopped (YES in S11), the monitoring center 10 calculates a vehicle stop duration of the autonomous vehicle (S12). Then, the monitoring center 10 specifies an area in which the autonomous vehicle 30 is present based on the vehicle state data (S12-3). For example, the analysis unit 12 can specify the area by collating the data of the current position of the vehicle with the map data. The monitoring center 10 reads the threshold corresponding to the area from the threshold storage unit 24, and compares the threshold with the vehicle stop duration (S13). If the vehicle stop duration is greater than or equal to the threshold (YES in S13), the monitoring center 10 transmits the data concerning the autonomous vehicle 30 to the operator terminal 40, and calls an operator (S14).

If it is determined that the autonomous vehicle 30 has resumed traveling and that the vehicle has resumed traveling without operator's assistance, the monitoring center 10 specifies an area in which the autonomous vehicle 30 was stopped. Then, the monitoring center 10 stores the vehicle stop period associated with the specified area. Thus, the threshold determining unit 15 can determine the threshold for each area.

The monitoring system of the third embodiment performs operator cooperation when the vehicle stop duration has become greater than or equal to the threshold, and does not send a notification to the operator unless the vehicle stop duration becomes greater than or equal to the threshold. Therefore, the number of notifications to the operator can be reduced. Further, since the threshold is determined based on the past vehicle stop periods for each area, the operator is notified at a timing appropriate for the characteristics of each area, such as an area that is likely to be congested or not likely to be congested. The vehicle stop period cannot be observed in the area in which the vehicle is not normally expected to be continuously stopped.

Accordingly, the threshold corresponding to such an area can be initialized to a small value (e.g., zero) so that the operator is immediately notified when the vehicle is found to be continuously stopped in such an area, which indicates that an abnormality has occurred.

Fourth Embodiment

Next, a monitoring system according to a fourth embodiment will be described. The basic configuration of the monitoring system according to the fourth embodiment is the same as the monitoring system 1 of the first embodiment (see FIG. 1). The fourth embodiment is different from the first embodiment in that a threshold for determining the vehicle stop duration corresponds to a road structure. The monitoring center 10 includes a threshold storage unit 25 (FIG. 8) that stores thresholds corresponding to road structures, instead of the threshold storage unit 22.

FIG. 8 is a diagram showing the data stored in the threshold storage unit 25. The threshold storage unit 25 stores thresholds associated with road structures. As shown in FIG. 8, the road structure may include, for example, "vicinity of a crosswalk," "vicinity of an intersection," "vicinity of a T-junction," and the like. The threshold is determined from the distribution of the data of the vehicle stop period acquired for each road structure. The vicinity of the road structure can be defined by a predetermined threshold. For example, a position within 50 m from a predetermined road structure can be defined as the vicinity of the road structure.

Figure 9:
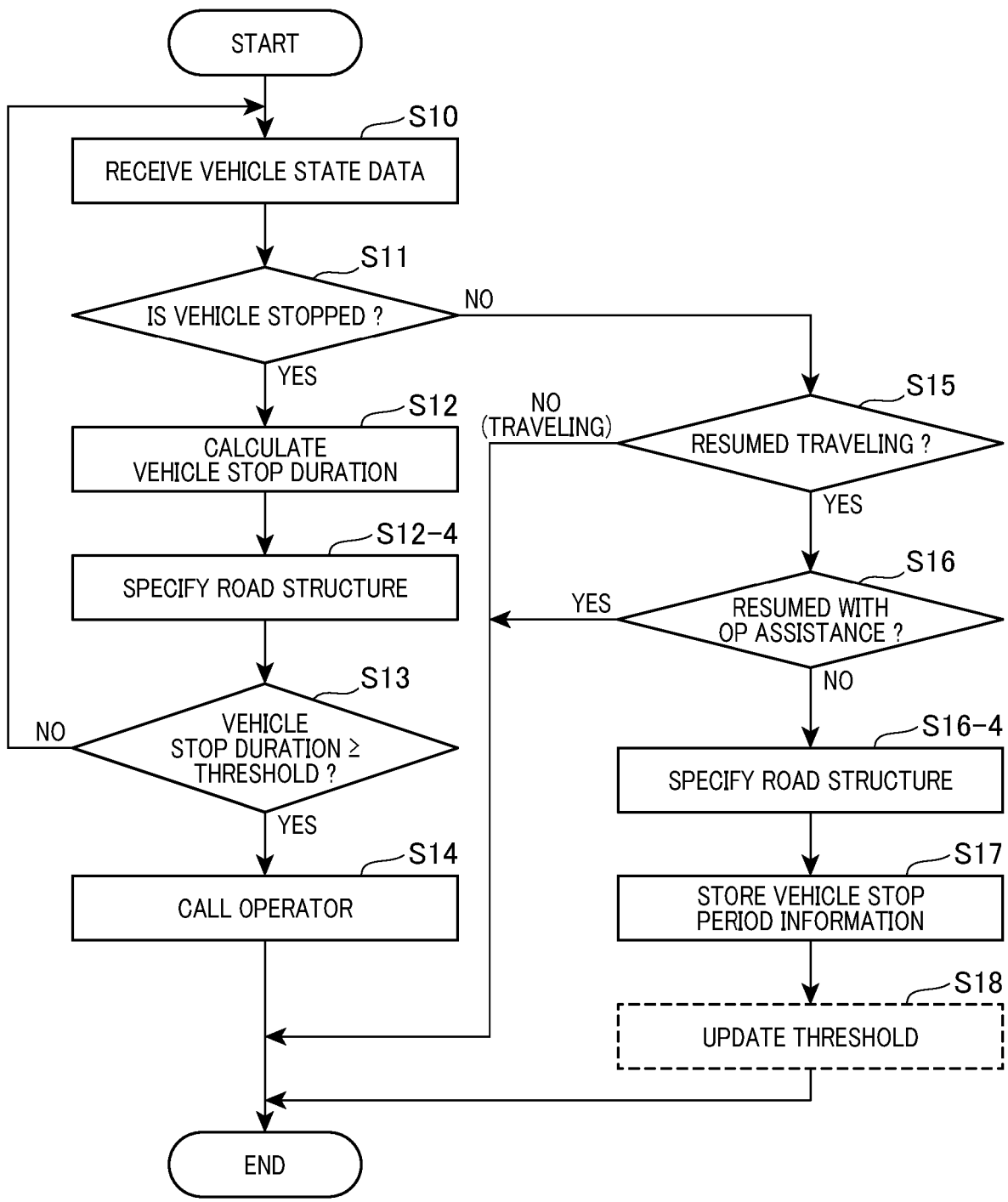
FIG. 9 is a diagram showing operation of a monitoring center of the fourth embodiment.

FIG. 9 is a flowchart showing operation of the monitoring center 10 according to the fourth embodiment. The basic operation of the monitoring center 10 according to the fourth embodiment is the same as that of the monitoring center 10 of the first embodiment. The monitoring center 10 of the fourth embodiment is different from that of the first embodiment in that it performs processing according to the road structure of the road on which the autonomous vehicle 30 is present. Accordingly, the following description focuses on the differences from the first embodiment.

The monitoring center 10 determines whether the autonomous vehicle 30 is stopped based on the vehicle state data transmitted from the vehicle (S11). If it is determined that the vehicle is stopped (YES in S11), the monitoring center 10 calculates a vehicle stop duration of the autonomous vehicle 30 (S12). Then, the monitoring center 10 specifies the road structure of the road on which the autonomous vehicle 30 is present, based on the surrounding environment data transmitted from the vehicle (S12-4). For example, the analysis unit 12 can analyze images of the outside of the vehicle to specify the location at which the autonomous vehicle 30 is located from among the "vicinity of a crosswalk," "vicinity of an intersection," and "vicinity of a T-junction." Further, the analysis unit 12 may use the road structure data included in the map data to specify the road structure based on the current position of the vehicle and the map data.

The monitoring center 10 reads the threshold corresponding to the road structure from the threshold storage unit 25, and compares the threshold with the vehicle stop duration (S13). If the vehicle stop duration is greater than or equal to the threshold (YES in S13), the monitoring center 10 transmits the data concerning the autonomous vehicle 30 to the operator terminal 40, and calls an operator (S14).

If it is determined that the autonomous vehicle 30 has resumed traveling (YES in S15) and that the vehicle has resumed traveling without operator's assistance (NO in S16), the monitoring center 10 specifies the road structure of the road on which the autonomous vehicle 30 was stopped (S16-4). Then, the monitoring center 10 stores the vehicle stop period associated with the specified road structure in the vehicle stop period storage unit 21 (S17). Thus, the threshold determining unit 15 can determine the threshold for each road structure.

The monitoring system of the fourth embodiment performs operator cooperation when the vehicle stop duration has become greater than or equal to the threshold, and does not send a notification to the operator unless the vehicle stop duration becomes greater than or equal to the threshold. Therefore, the number of notifications to the operator can be reduced. Further, since the threshold corresponds to the road structure, a notification can be performed at a timing appropriate for the characteristics of each road structure. For example, in the vicinity of a crosswalk, the vehicle stop duration tends to be long due to waiting for pedestrians to cross a road.

Fifth Embodiment

Next, a monitoring system according to a fifth embodiment will be described. The basic configuration of the monitoring system according to the fifth embodiment is the same as the monitoring system 1 of the first embodiment (see FIG. 1). The fifth embodiment is different from the first embodiment in that a threshold for determining the vehicle stop duration corresponds to a time period. The monitoring center 10 includes a threshold storage unit 26 (FIG. 10) that stores thresholds corresponding to time periods, instead of the threshold storage unit 22.

FIG. 10 is a diagram showing the data stored in the threshold storage unit 26. The threshold storage unit 26 stores thresholds associated with time periods. As shown in FIG. 10, the time period may include, for example, "0:00-6:00," "6:00-12:00," "12:00-18:00" and "18:00-0:006." The threshold is determined from the distribution of the data of the vehicle stop period acquired for each time period. The time periods shown in FIG. 10 are merely examples, and may also be every three hours, or may include a night time, morning and evening rush hours, and the like.

Figure 11:
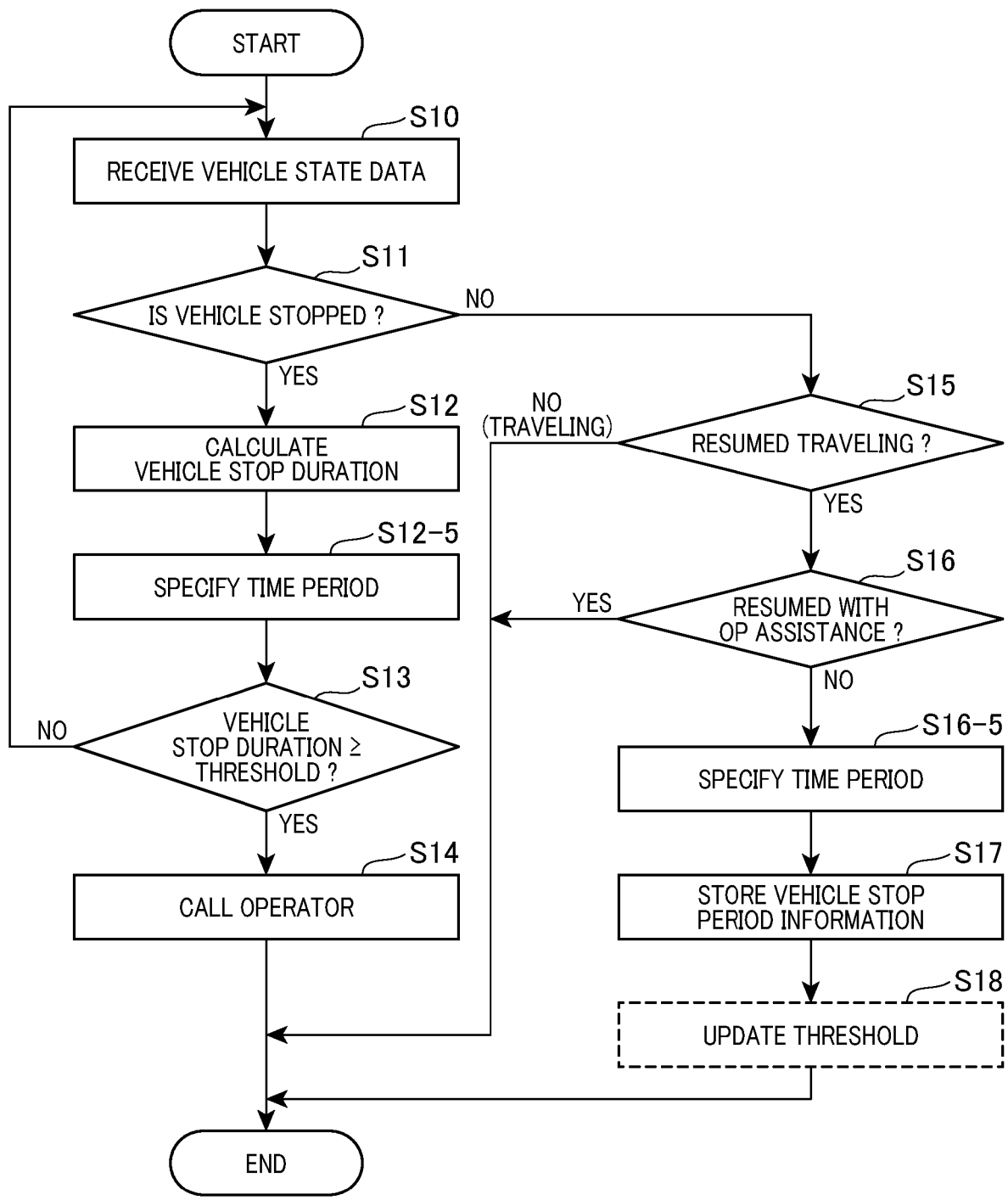
FIG. 11 is a diagram showing operation of a monitoring center of the fifth embodiment.

FIG. 11 is a flowchart showing operation of the monitoring center 10 according to the fifth embodiment. The basic operation of the monitoring center 10 according to the fifth embodiment is the same as that of the monitoring center 10 of the first embodiment. The monitoring center 10 of the fifth embodiment is different from that of the first embodiment in that it performs processing according to the time period. Accordingly, the following description focuses on the differences from the first embodiment.

The monitoring center 10 determines whether the autonomous vehicle 30 is stopped, based on the vehicle state data transmitted from the vehicle (S11). If it is determined that the vehicle is stopped (YES in S11), the monitoring center 10 calculates a vehicle stop duration of the autonomous vehicle 30 (S12). Then, the monitoring center 10 specifies the time period including the current time (S12-5). The monitoring center 10 reads the threshold corresponding to the time period from the threshold storage unit 26, and compares the threshold with the vehicle stop duration (S13). If the vehicle stop duration is greater than or equal to the threshold (YES in S13), the monitoring center 10 transmits the data concerning the autonomous vehicle 30 to the operator terminal 40, and calls an operator (S14).

If it is determined that the autonomous vehicle 30 has resumed traveling (YES in S15) and that the vehicle has resumed traveling without operator's assistance (NO in S16), the monitoring center 10 specifies a time period in which the autonomous vehicle 30 was stopped (S16-5). Then, the monitoring center 10 stores the vehicle stop period associated with the specified time period in the vehicle stop period storage unit 21 (S17). Thus, the threshold determining unit 15 can determine the threshold for each time period.

The monitoring system of the fifth embodiment performs operator cooperation when the vehicle stop duration has become greater than or equal to the threshold, and does not send a notification to the operator unless the vehicle stop duration becomes greater than or equal to the threshold. Therefore, the number of notifications to the operator can be reduced. Further, since the threshold corresponds to the time period, a notification can be performed at a timing appropriate for each of the crowded time period and the non-crowded time period.

Sixth Embodiment

In the examples described in the above second to fifth embodiments, the threshold associated with the driving scene, area, road structure or time period is used to perform the operator cooperation when the vehicle stop duration becomes appropriate for the driving scene, area, road structure or time period.

It is also possible to use a combination of two, three or all of the driving scene, area, road structure and time period. In a sixth embodiment, an example will be described in which a combination of an area and a road structure is used.

The basic configuration of the monitoring system according to the sixth embodiment is the same as the monitoring system 1 of the first embodiment (see FIG. 1). The sixth embodiment is different from the first embodiment in that a threshold for determining the vehicle stop duration corresponds to an area and a road structure. The monitoring center 10 includes a threshold storage unit 27 (FIG. 12) that stores thresholds corresponding to areas and road structures, instead of the threshold storage unit 22.

FIG. 12 is a diagram showing the data stored in the threshold storage unit 27. The threshold storage unit 27 stores thresholds associated with areas and road structures. As shown in FIG. 12, the areas may include "area A," "area B," "area C," and the like, and the road structures may include "vicinity of a crosswalk," "vicinity of an intersection," "vicinity of a T-junction," and the like. The threshold corresponding to both the "area A" and "vicinity of a crosswalk," the threshold corresponding to both the "area A" and "vicinity of an intersection," . . . are stored. The threshold is determined from the distribution of the data of the vehicle stop period acquired for each situation.

Figure 13:
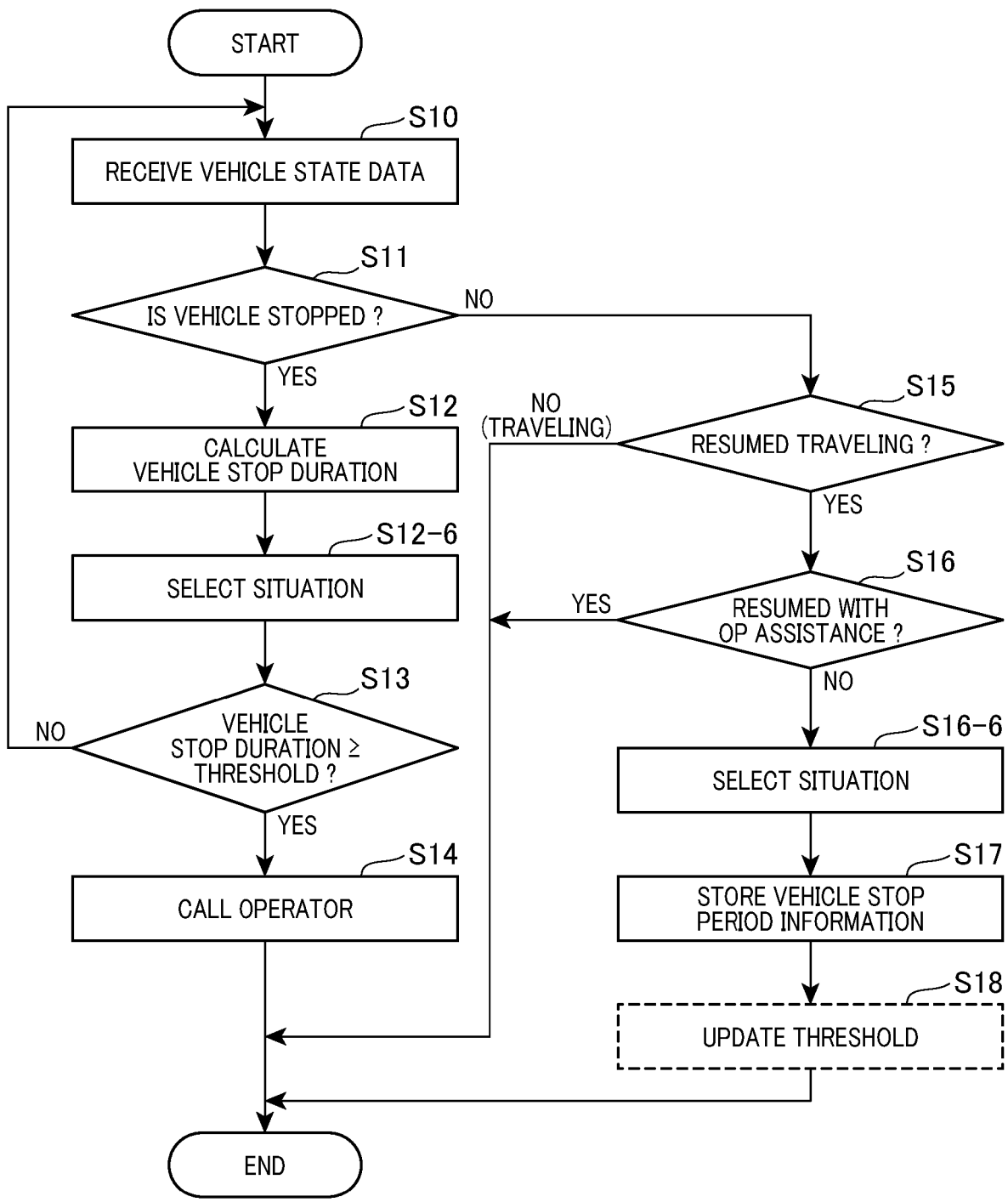
FIG. 13 is a diagram showing operation of a monitoring center of the sixth embodiment.

FIG. 13 is a flowchart showing operation of the monitoring center 10 according to the sixth embodiment. The basic operation of the monitoring center 10 according to the sixth embodiment is the same as that of the monitoring center 10 of the first embodiment. The monitoring center 10 of the sixth embodiment is different from that of the first embodiment in that it performs the processing according to a plurality of situations. Accordingly, the following description focuses on the differences from the first embodiment.

The monitoring center 10 determines whether the autonomous vehicle 30 is stopped, based on the vehicle state data transmitted from the vehicle (S11). If it is determined that the vehicle is stopped (YES in S11), the monitoring center 10 calculates a vehicle stop duration of the autonomous vehicle 30 (S12). Then, the monitoring center 10 specifies the situation in which the autonomous vehicle 30 is located, based on the vehicle state data (S12-6). In this case, the area and the road structure in which the autonomous vehicle 30 is located is specified. The method of specifying the area and the road structure has been described in the third and fourth embodiments.

The monitoring center 10 reads the threshold corresponding to the situation from the threshold storage unit 27, and compares the threshold with the vehicle stop duration (S13). If the vehicle stop duration is greater than or equal to the threshold (YES in S13), the monitoring center 10 transmits the data regarding the autonomous vehicle 30 to the operator terminal 40, and calls an operator (S14).

If it is determined that the autonomous vehicle 30 has resumed traveling (YES in S15) and that the vehicle has resumed traveling without operator's assistance (NO in S16), the monitoring center 10 specifies the situation in which the autonomous vehicle 30 was stopped (S16-6). Then, the monitoring center 10 stores the vehicle stop period associating with the specified situation in the vehicle stop period storage unit 21 (S17). Thus, the threshold determining unit 15 can determine the threshold for each situation.

The monitoring system of the sixth embodiment performs operator cooperation when the vehicle stop duration has become greater than or equal to the threshold, and does not send a notification to the operator unless the vehicle stop duration becomes greater than or equal to the threshold. Therefore, the number of notifications to the operator can be reduced. Further, since the threshold corresponds to the specific situation in which the autonomous vehicle 30 is present, a notification can be performed at a timing appropriate for each of the specific situations.

Seventh Embodiment

Figure 14:
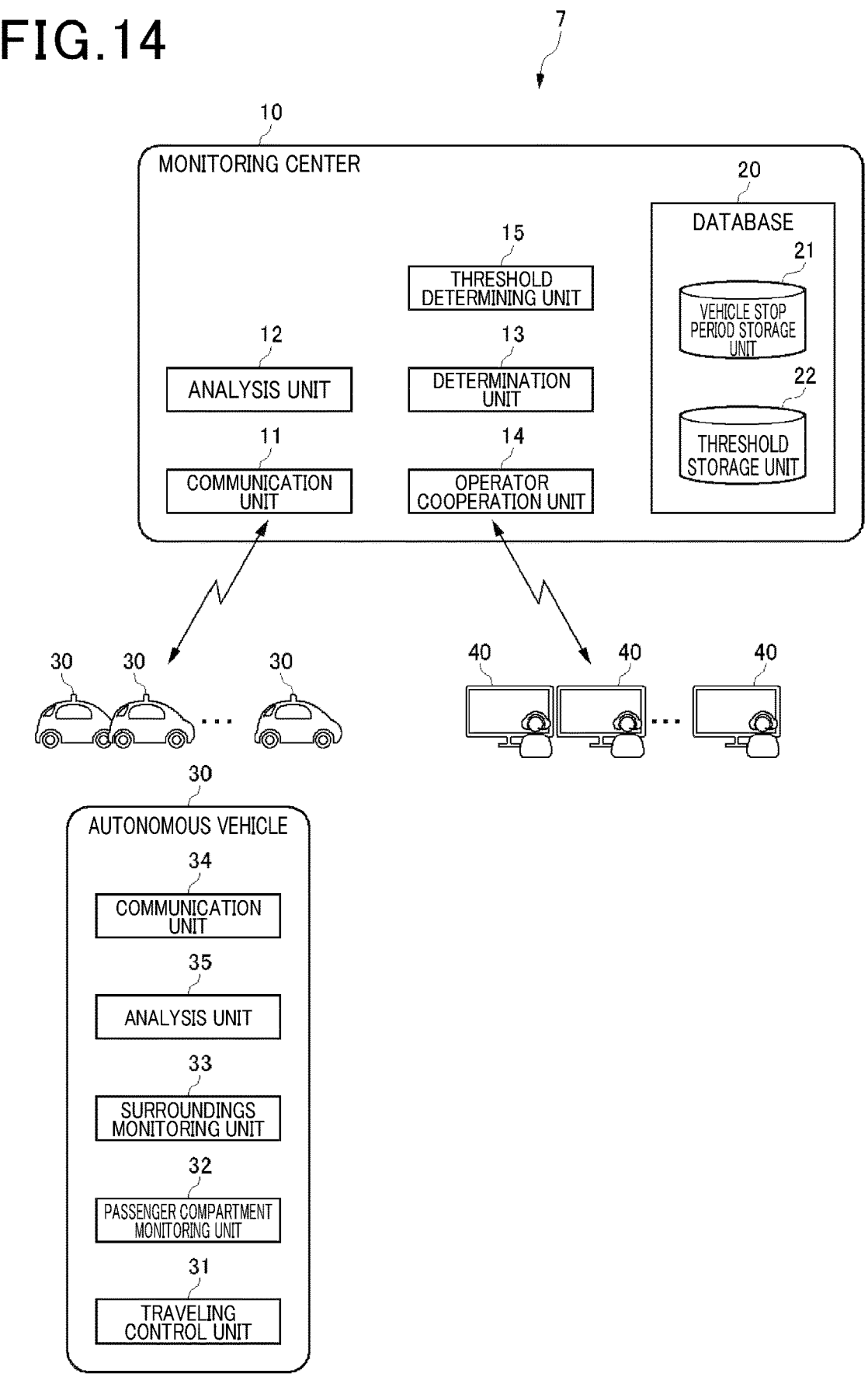
FIG. 14 is a diagram showing a configuration of a monitoring system of a seventh embodiment.

FIG. 14 is a diagram showing a configuration of a monitoring system 7 of a seventh embodiment. In the monitoring system according to the first to sixth embodiments, the monitoring center 10 calculates a vehicle stop duration of the autonomous vehicle 30 based on the vehicle state data transmitted from the autonomous vehicle 30.

However, in the seventh embodiment, the autonomous vehicle 30 calculates a vehicle stop duration and transmits the data of the calculated vehicle stop duration to the monitoring center 10.

The autonomous vehicle 30 includes an analysis unit 35 in addition to the configuration of the autonomous vehicle 30 described in the first embodiment. The analysis unit 35 obtains a vehicle stop duration, which is a period of time for which the autonomous vehicle 30 has been stopped up to the current time, based on the vehicle speed data. Further, the analysis unit 35 obtains a vehicle stop period, which is a period of time from when the autonomous vehicle 30 makes a stop to when the autonomous vehicle 30 resumes traveling. Then, the autonomous vehicle 30 transmits the data of the obtained vehicle stop duration or the data of the obtained vehicle stop period to the monitoring center 10.

The above analysis unit 35 may also be implemented by a program. Such a program causes a computer to execute functions of measuring a period of time for which the vehicle has been stopped upon reception of the detection data indicating that the vehicle has made a stop, and transmitting the result of measurement to the monitoring center 10 as a vehicle stop duration.

As described above, since the autonomous vehicle 30 obtains the vehicle stop duration or the vehicle stop period, it is not necessary for the monitoring center 10 to calculate a vehicle stop duration or a vehicle stop period of a large number of autonomous vehicles 30.

Accordingly, the calculation load can be reduced.

Eighth Embodiment

Figure 15:
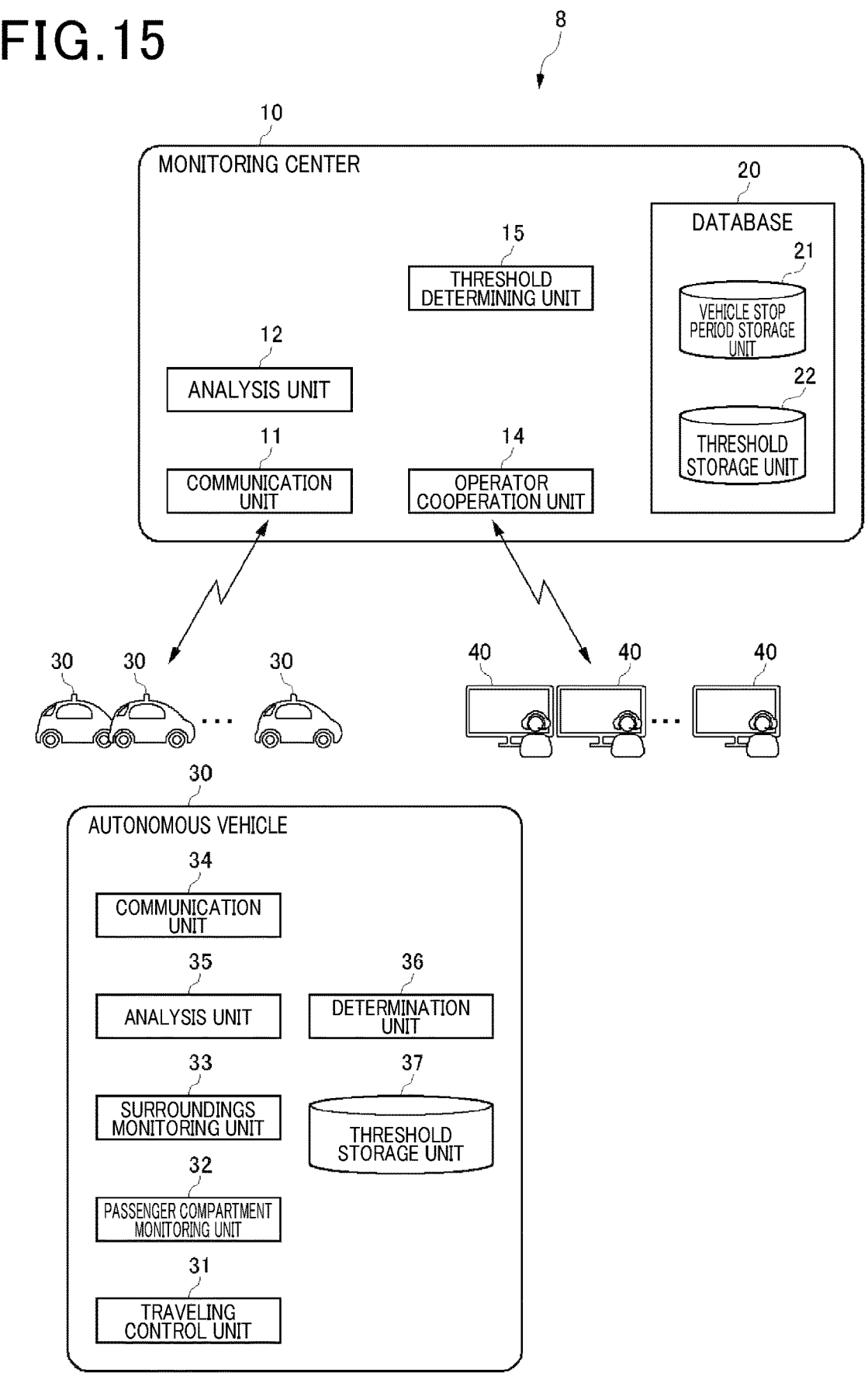
FIG. 15 is a diagram showing a configuration of a monitoring system of an eighth embodiment.

FIG. 15 is a diagram showing a configuration of a monitoring system 8 of an eighth embodiment. In the monitoring system according to the first to sixth embodiments, the monitoring center 10 determines whether the vehicle stop duration becomes greater than or equal to the threshold. However, in the monitoring system 8 according to the eighth embodiment, the autonomous vehicle 30 performs this determination.

After the threshold determining unit 15 determines the threshold, the monitoring center 10 distributes the data of the threshold to each autonomous vehicle 30. The autonomous vehicle 30 stores the data of the threshold distributed from the monitoring center 10 in the threshold storage unit 37. The autonomous vehicle 30 includes the analysis unit 35 that obtains a vehicle stop duration based on the vehicle speed data, and a determination unit 36 that determines whether the vehicle stop duration is greater than or equal to the threshold. When the determination unit 36 determines that the vehicle stop duration is greater than or equal to the threshold, it transmits a signal to the monitoring center 10 to request assistance from the operator.

The above analysis unit 35 and determination unit 36 may also be implemented by a program. Such a program causes a computer to execute functions of measuring a vehicle stop duration for which the vehicle has been stopped upon reception of the detection data indicating that the vehicle has made a stop, determining whether the vehicle stop duration is greater than or equal to the threshold read from the threshold storage unit 22, and transmitting a request for assistance to the monitoring center 10 when the vehicle stop duration is determined to be greater than or equal to the threshold.

As described above, the autonomous vehicle 30 determines whether the vehicle stop duration has become greater than or equal to the threshold, and transmits a request for assistance to the monitoring center 10 when the vehicle stop duration has become greater than or equal to the threshold. Accordingly, the number of communications from the autonomous vehicle 30 to the monitoring center 10 can be reduced, and the calculation load on the monitoring center 10 can be reduced.

Ninth Embodiment

Figure 16:
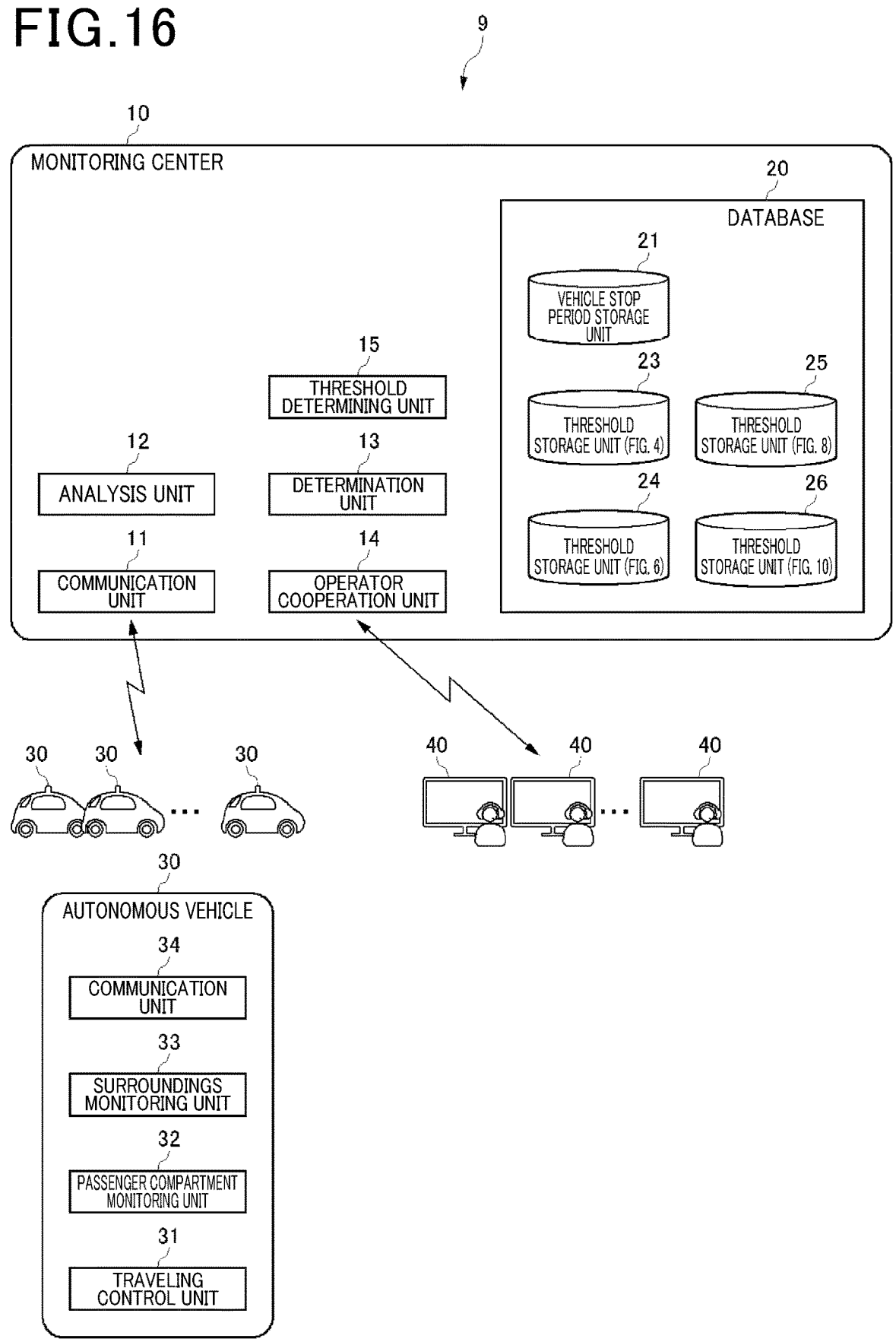
FIG. 16 is a diagram showing a configuration of a monitoring system of a ninth embodiment.

FIG. 16 is a diagram showing a configuration of a monitoring system 9 of a ninth embodiment. The monitoring center 10 of the ninth embodiment includes the threshold storage units 23 to 26 described in the second to fifth embodiments. The analysis unit 12 of the monitoring center 10 obtains the driving scene, area, road structure and time period in which the autonomous vehicle 30 is present, based on the vehicle state data and the surrounding environment data transmitted from the autonomous vehicle 30, and reads the threshold corresponding to each item from the threshold storage units 23 to 26. Then, the determination unit 13 compares the vehicle stop duration of the autonomous vehicle 30 with each threshold corresponding to each item. The determination unit 13 counts the number of items for which the vehicle stop duration has become greater than or equal to the threshold. The determination unit 13 determines to perform operator cooperation when the vehicle stop duration has become greater than or equal to the threshold for two or more items (for example, the threshold corresponding to the driving scene, the threshold corresponding to the area, or the like). Although two or more items are used as examples in the above description, operator cooperation may also be performed when the vehicle stop duration becomes greater than or equal to the threshold for three or more items, or all the items.

Alternatively, the priority of notifications to the operator may be determined depending on the number of items for which the vehicle stop duration becomes greater than or equal to the threshold. That is, the priority may be set to "high" when the vehicle stop duration has become greater than or equal to the threshold for all the four items, "medium" when the vehicle stop duration has become greater than or equal to the threshold for three items, and "low" when the vehicle stop duration has become greater than or equal to the threshold for two items. Accordingly, assignment to the operator is made from the higher priority, and a notification is sent to the operator terminal of the assigned operator.

The monitoring system according to the present disclosure is useful as a system for monitoring autonomous vehicles.

A monitoring center according to the present disclosure is a monitoring center configured to communicate with an autonomous vehicle (30) via a network and monitor the autonomous vehicle. The monitoring center includes: a threshold storage unit (22) that stores a threshold of a vehicle stop duration for determining whether it is necessary to provide operator's assistance; a communication unit (11) that receives vehicle state data from the autonomous vehicle; an analysis unit (12) that obtains a vehicle stop duration from the vehicle state data, the vehicle stop duration being a period of time for which the autonomous vehicle has been stopped up to a current time; a determination unit (13) that determines whether the vehicle stop duration of the autonomous vehicle is greater than or equal to the threshold stored in the threshold storage unit; an operator cooperation unit (14) that notifies an operator of data concerning the autonomous vehicle when the vehicle stop duration of the autonomous vehicle is greater than or equal to the threshold; a vehicle stop period storage unit (21) that obtains a vehicle stop period from the vehicle state data and stores the vehicle stop period, the vehicle stop period being a period of time from when the autonomous vehicle makes a stop to when the autonomous vehicle resumes traveling without operator's assistance; and a threshold determining unit that determines the threshold based on a distribution of the vehicle stop period. The threshold determining unit stores the determined threshold in the threshold storage unit.

According to the present disclosure, a notification to an operator is sent when a predetermined vehicle stop duration has elapsed. Accordingly, the frequency of calling an operator decreases, thereby reducing a load on the operator.

What is claimed is:

1. A monitoring center configured to communicate with an autonomous vehicle via a network and monitor the autonomous vehicle, the monitoring center comprising:
   a central processing unit (CPU);
   a random access memory (RAM) or a read-only memory (ROM); and programs having modules stored on the RAM or the ROM that cause the CPU to:
  determine, based on a distribution of a first stop duration of the autonomous vehicle obtained from vehicle state data, at least one threshold, the first stop duration being a period from a time point when the autonomous vehicle has been stopped to a time point when the autonomous vehicle resumes traveling without an operator's assistance;
  store the at least one threshold in the RAM or the ROM;
  obtain a second stop duration of the autonomous vehicle from the vehicle state data, the second stop duration being a period for which the autonomous vehicle has been stopped up to a current time;
  determine whether the second stop duration is greater than or equal to the at least one threshold; and
  notify an operator terminal of data concerning the autonomous vehicle when the second stop duration is greater than or equal to the at least one threshold.

2. The monitoring center according to claim 1, wherein the at least one threshold includes a plurality of thresholds determined for each driving scene, and
the programs further cause the CP to:
  obtain a driving scene and the second stop duration from the vehicle state data; and
  determine whether the second stop duration is greater than or equal to a threshold of the plurality of thresholds corresponding to a current driving scene.

3. The monitoring center according to claim 1, wherein the at least one threshold includes a plurality of thresholds determined for each area, and
the programs further cause the CPU to:
  obtain an area in which the autonomous vehicle is stopped and the second stop duration from the vehicle state data; and
  determine whether the second stop duration is greater than or equal to a threshold of the plurality of thresholds corresponding to a current area.

4. The monitoring center according to claim 1, wherein the at least one threshold includes a plurality of thresholds determined for each road structure, and
the programs further cause the CPU to:
  obtain a road structure of a road on which the autonomous vehicle is stopped and the second stop duration from the vehicle state data; and
  determine whether the second stop duration is greater than or equal to a threshold of the plurality of thresholds corresponding to the road structure of the road on which the autonomous vehicle is currently stopped.

5. The monitoring center according to claim 1, wherein the at least one threshold includes a plurality of thresholds determined for each time period, and
the programs further cause the CPU to determine whether the second stop duration is greater than or equal to a threshold of the plurality of thresholds corresponding to a current time period.

6. The monitoring center according to claim 1, wherein a communication unit receives data concerning a surrounding environment of the autonomous vehicle, and
the programs further cause the CPU to obtain the second stop duration, which is obtained by excluding a period for which the autonomous vehicle has been stopped in a specific situation where the autonomous vehicle needs to be stopped.

7. The monitoring center according to claim 1, wherein the programs further cause the CPU to calculate the second stop duration from speed data of the autonomous vehicle included in the vehicle state data.

8. The monitoring center according to claim 1, wherein the programs further cause the CPU to obtain data of the second stop duration included in the vehicle state data.

9. A monitoring system which includes an autonomous vehicle and a monitoring center connected to the autonomous vehicle via a network and configured to monitor the autonomous vehicle, the monitoring system comprising:
  a central processing unit (CPU);
  a random access memory (RAM) or a read-only memory (ROM); and
  programs having modules stored on the RAM or the ROM that cause the CPU to:
    determine, based on a distribution of a first stop duration of the autonomous vehicle obtained from vehicle state data, at least one threshold, the first stop duration being a period from a time point when the autonomous vehicle has been stopped to a time point when the autonomous vehicle resumes traveling without an operator's assistance;
    store the at least one threshold in the RAM or the ROM;
    obtain a second stop duration of the autonomous vehicle from the vehicle state data, the second stop duration being a period for which the autonomous vehicle has been stopped up to a current time;
    determine whether the second stop duration is greater than or equal to the at least one threshold; and
    notify an operator terminal of data concerning the autonomous vehicle when the second stop duration is greater than or equal to the at least one threshold.

10. The monitoring system according to claim 9, wherein the at least one threshold includes a plurality of thresholds determined for each driving scene, and
the programs further cause the CPU to:
  obtain a driving scene and the second stop duration from the vehicle state data; and
  determine whether the second stop duration is greater than or equal to a threshold of the plurality of thresholds corresponding to a current driving scene.

11. The monitoring system according to claim 9, wherein the at least one threshold includes a plurality of thresholds determined for each area, and
the programs further cause the CPU to:
  obtain an area in which the autonomous vehicle is stopped and the second stop duration from the vehicle state data; and
  determine whether the second stop duration is greater than or equal to a threshold of the plurality of thresholds corresponding to a current area.

12. The monitoring system according to claim 9, wherein the at least one threshold includes a plurality of thresholds determined for each road structure, and
the programs further cause the CP to:
  obtain a road structure of a road on which the autonomous vehicle is stopped and the second stop duration from the vehicle state data; and
  determine whether the second stop duration is greater than or equal to a threshold of the plurality of thresholds corresponding to the road structure of the road on which the autonomous vehicle is currently stopped.

13. The monitoring system according to claim 9, wherein the at least one threshold includes a plurality of thresholds determined for each time period, and the programs further cause the CPU to determine whether the second stop duration is greater than or equal to a threshold of the plurality of thresholds corresponding to a current time period.

14. The monitoring system according to claim 9, wherein the programs further cause the CPU to:
   obtain data concerning a surrounding environment of the autonomous vehicle; and
   obtain the second stop duration by excluding a period for which the autonomous vehicle has been stopped in a specific situation where the autonomous vehicle needs to be stopped.

15. A method performed by a monitoring center that monitors an autonomous vehicle for cooperating with an operator that provides assistance to the autonomous vehicle, the monitoring center comprising a central processing unit (CPU) and a random access memory (RAM) or a read-only memory (ROM) storing programs having modules, the method comprising the steps of:
   receiving vehicle state data of the autonomous vehicle;
   determining, based on a distribution of a first stop duration of the autonomous vehicle obtained from the vehicle state data, at least one threshold, the first stop duration being a period from a time point when the autonomous vehicle has been stopped to a time point when the autonomous vehicle resumes traveling without an operator's assistance;
   storing the at least one threshold in the RAM or the ROM;
   obtaining a second stop duration of the autonomous vehicle from the vehicle state data, the second stop duration being a period for which the autonomous vehicle has been stopped up to a current time; and
   determining whether the second stop duration is greater than or equal to the at least one threshold stored in the RAM or the ROM; and
   notifying an operator terminal of data concerning the autonomous vehicle when the second stop duration is greater than or equal to the at least one threshold.

* * * * *